INVENTORS
RUDOLF DEURINGER
BY ROBERT A. RAY
JAMES C. STERNBERG

BY          ATTORNEY

United States Patent Office

3,701,716
Patented Oct. 31, 1972

3,701,716
LIQUID ANALYSIS APPARATUS
Rudolf Deuringer, El Toro, and Robert A. Ray and James C. Sternberg, Fullerton, Calif., assignors to Beckman Instruments, Inc.
Filed Apr. 15, 1969, Ser. No. 816,329
Int. Cl. C12k 1/10
U.S. Cl. 195—127          13 Claims

ABSTRACT OF THE DISCLOSURE

An apparatus for batch analysis of liquid samples wherein syringes are employed for delivering repeatable volumes of reagent to a cell prior to the addition of a sample and for withdrawing liquid from the cell after analysis thereof. Sensing means, such as a polarographic oxygen sensor, is mounted in the side wall of the cell with its sensing end contacting the liquid therein. A stirring element is positioned within the cell and rotated about the vertical axis of the cell so that a high tangential stirring force is produced to promote mixing of sample with reagent and to optimize sensor performance, yet only small sample volumes are required. The apparatus is particularly suited for rate sensing batch analysis of biological fluids such as blood or urine.

BACKGROUND OF THE INVENTION

The present invention relates generally to an analysis apparatus and, more particularly, to an apparatus for use in the batch analysis of liquids.

The apparatus of the present invention is particularly applicable for use in the rate sensing batch analysis of solutions such as is described in copending patent application of Sternberg, entitled "Rate Sensing Batch Analyzer," Ser. No. 618,859, filed Feb. 27, 1967, and assigned to the assignee of the present application. As disclosed in the aforementioned Sternberg application, rapid analysis of the glucose concentration of blood may be achieved by mixing a single batch sample of the blood with buffered glucose oxidase. The mixture is stirred and a reaction proceeds in the presence of a polarographic oxygen sensor which provides an electrical response that is linear with respect to the oxygen concentration of the mixture. The polarographic sensor is of a type constructed in accordance with the teachings of U.S. Pat. No. 2,913,386 to Clark. The electrical response of the sensor is converted by a direct differentiation system to a single proportional to the time rate of change of oxygen of the mixture, and this signal is recorded and the maximum recorded signal determines the quantity of glucose initially present in the blood sample. The rate sensing batch procedure disclosed in the Sternberg application may be utilized in enzyme assay, wherein equal samples of enzymes to be assayed are added to an excess of buffered substrate in the presence of an oxygen concentration sensor. The electrical response is again converted directly to a time rate of change signal and this signal is recorded. The maximum rate recorded is proportional to enzyme activity.

It is desirable to have an apparatus for use in performing the aforementioned and similar rate sensing analyses which permits rapid delivery of repeatable volumes of reagent to a cell and complete withdrawal of liquid from the cell after analysis thereof, requires only minimum sample quantity, permits rapid addition of sample, and, in some cases, of a reaction-triggering reagent to the major volume of reagent already equilibrated with the sensing system, and minimizes those conditions which cause noise to be produced by the sensing system, since the direct differentiation systems utilized for rate sensing analysis are inherently particularly noise-sensitive. Heretofore, no analysis apparatus has been made available which incorporates the aforementioned characteristics.

SUMMARY OF THE INVENTION

It is the principal object of the present invention to provide an improved apparatus for rate sensing analysis.

Another object of the invention is to provide an apparatus for rate sensing analysis in which repeatable volumes of reagent may be rapidly delivered to a cell and complete withdrawal of liquid from the cell is achieved after analysis thereof.

Still a further object of the invention is to provide a liquid analysis cell embodying a sample stirrer and a sensing system arranged in such a manner so as to permit the use of very small samples and in which a high signal-to-noise ratio is achieved in the rate sensing analysis of the sample.

According to the principal aspect of the present invention, there is provided a liquid analysis apparatus comprising a cell having a chamber therein opening at the top of the cell and adapted to hold a liquid sample. Means are provided for mounting in the cell a suitable sensor for analysis of liquid therein. Inlet and outlet passages communicate with the bottom of the chamber in the cell. A first pumping means is provided for delivering a repeatable volume of reagent from a reservoir through the inlet passage into the chamber and a second pumping means is provided for withdrawing liquid mixture from the chamber through the outlet passage of the cell after the sample-reagent mixture has been analyzed. A restricted line is provided adjacent to the outlet passage of the cell. The restricted line causes slow drainage of liquid from the cell chamber during operation of the second pumping means, thus ensuring complete drainage of liquid from the chamber, and further serves as a valve to prevent liquid flow therethrough except during the operation of the second pumping means.

According to another aspect of the invention, the pumping means utilized in the above described apparatus is in the form of a syringe in which the plunger is held stationary and the barrel of the syringe actuated manually to deliver liquid from the interior of the barrel through a flexible conduit to the sample chamber. The syringe permits repeatable volumes of reagent to be delivered to the cell chamber. Another aspect of the invention is mounting the sensor, for example a polarographic oxygen sensor, in the side wall of the analysis cell and providing in the chamber of the cell a magnetic stirring element which is caused to rotate about the vertical axis of the chamber thus producing a relatively high tangential stirring force adjacent to the sensing end of the sensor. This arrangement provides a high signal-to-noise ratio which is important in a direct differentiation system such as utilized in rate sensing analysis.

These and other objects, aspects and advantages of the invention will become apparent from the following description taken in connection with the accompanying drawings.

DESCRIPTION OF THE PREFERRED EMBODIMENT

Figure 1:
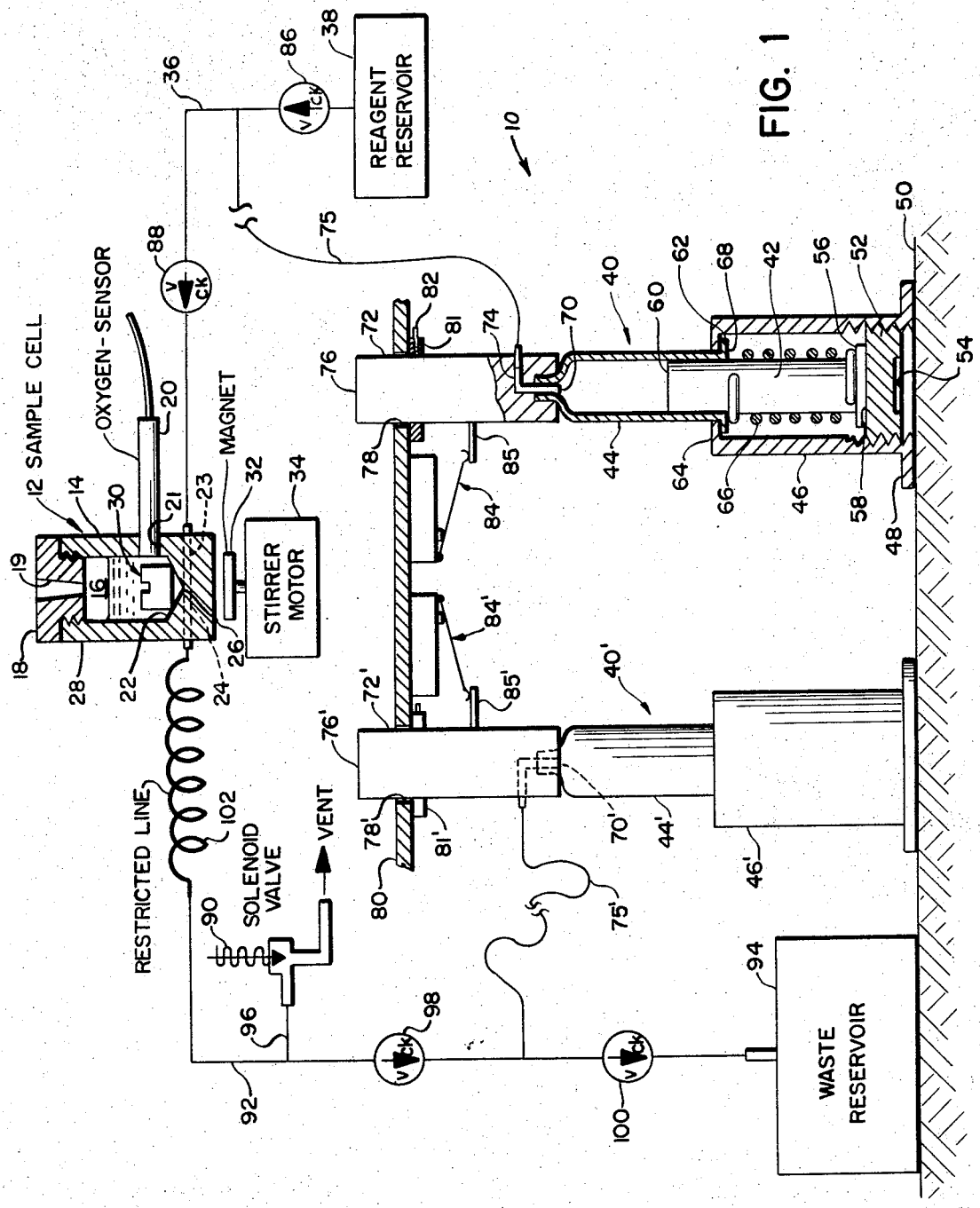
FIG. 1 is a schematic illustration of a liquid analysis apparatus embodying the features of the present invention.

Referring now to FIG. 1 in detail, the analysis apparatus of the present invention is generally referred to by numeral 10. The apparatus includes an analysis cell 12 formed of a block 14 preferably of hydrophobic insulating material, such as polytetrafluoroethylene, polychlorotrifluoroethylene or polypropylene, although the block could be formed of a metal coated with polytetrafluoroethylene or other similar hydrophobic plastic materials. A cylindrical vertically extending chamber 16 is formed in the block. A threaded cap 18 closes the upper end of the chamber 16. A vertical extending tapered bore 19 is provided in the cap for guiding the tip of a microsampling device, such as a pipette or burette (not shown), into a repeatable position in the chamber whereby sample may be delivered to the chamber. A liquid analysis sensor 20, such as a polarographic oxygen sensor, is mounted in a bore 21 which extends horizontally through the wall of the block 14. The bottom 22 of the chamber 16 has an inverted conical configuration. A pair of passages 23 and 24, respectively, lie in a generally horizontal plane and intersect one another at the apex 26 of the conical bottom of the chamber. The outer ends of passages open at the outer surface 28 of the block. A magnetic stirring element 30 is positioned in the chamber. This element is adapted to be rotated by a magnet 32 positioned below the block 14 and rotated by means of a stirrer motor 34. Further details of the cell 12, sensor 20 and element 30 will appear later.

A conduit 36 connects the passage 23 in the cell 12 to a reservoir 38 which is adapted to contain a suitable reagent, such as glucose oxidase. A pump, generally designated 40, is provided for withdrawing reagent from the reservoir 38 and for delivering the same through the passage 23 into the chamber 16 of the analysis cell. This pump is preferably in the form of a syringe including a plunger 42 which is mounted so as to be stationary and a barrel 44 which is movable with respect to the plunger. More specifically, the pump includes a vertically extending cylindrical casing 46 having an outwardly extending flange 48 which may be affixed by any suitable means to a supporting surface 50. A stop member 52, such as a set screw, is threadedly engaged in the bottom portion of the casing 46. A slot 54 is provided in the bottom surface of the stop member to facilitate its adjustment within the casing. An outwardly extending flange 56 is provided at the lower end of the plunger 42 and is supported by the upper surface 58 of stop member 52. The upper end 60 of the plunger is slideably received within the lower end of barrel 44. The barrel is provided with an outwardly extending flange 62 adjacent to its lower end while the casing 46 is provided with an inwardly extending flange 64 which lies above the flange 62 on the barrel. A coil spring 66 surrounds the plunger 42. The lower end of this spring bears against the upper surface of flange 56 and thus urges the plunger 42 into engagement with the upper surface 58 of the stop member. The upper convolution of the spring 66 bears against the lower surface 68 of flange 62 on the barrel and thus urges the barrel into engagement with the flange 64. Thus, the flange 64 functions as a stop element limiting the upward movement of the barrel 44 with respect to the plunger 42.

The upper end of the barrel 44 is provided with an outlet 70. A barrel actuator 72 is fixedly mounted to the upper end of the barrel 44 and is provided with a passage 74 at its lower end in communication with the outlet 70. This passage 74 is connected through means of a flexible conduit 75 to the conduit 36. The conduit 75 is sufficiently long and flexible so as to be capable of being moved together with the barrel 44 when the latter is thrust toward the plunger 42. The upper end 76 of the barrel actuator extends through an opening 78 in a wall 80 of the apparatus and thus is conveniently positioned for manual operation by an operator. In actual practice, it is preferable that the cell 12 be mounted in the wall 80 of the housing of the apparatus so that sample may be delivered into the chamber 16 from above the wall, while the sensor 20 stirrer motor 34 are located together with pump assembly 40 below the wall and thus out of view. This arrangement also facilitates thermostatting of the cell 12 and the reagent pump 40.

It can be readily appreciated that when an operator applies pressure to the upper end 76 of the barrel forcing the barrel down upon the stationary plunger 42, liquid within the barrel will be forced out through the outlet 70, passage 74 and flexible conduit 75. Upon releasing the actuator 72, the spring 66 will return the barrel 44 toward its uppermost position creating a partial vacuum in the barrel 44 which draws liquid through the conduit 75 into the barrel. The stroke of the barrel 44 relative to the plunger 42, and thus the volume of liquid delivered by the syringe pump 40, may be set at any predetermined value by adjusting the stop member 52 in the casing 46. This adjustment, of course, must be made prior to mounting the casing 46 to the surface 50. It can be appreciated that the extent of upward movement of the barrel 44 relative to the plunger, and thus the volume of liquid delivered by the pump, is controlled by the engagement of flange 62 on the barrel with the flange 64 on the casing 46. If it is desired to decrease the volume of liquid conveyed by the pump 40 after the casing 46 has been secured to the surface 50, a second adjusting element may be provided. This element comprises a collar 81 which is adjustably mounted on the actuator 72 by means of a set screw 82. It can be seen that by raising the collar 81 from the position shown in FIG. 1, the barrel 44 will be shifted downwardly due to the engagement of the collar 81 with the housing wall 80, thus decreasing the volume of the interior barrel 44.

A switch, generally designated 84, is mounted on the lower side of the housing wall 80. This switch is provided for controlling the stirrer motor 34 and will be described in greater detail later in connection with the description of FIG. 2. The switch 84 is actuated by means of a finger 85 which extends outwardly from the side of the barrel actuator 72.

As seen in FIG. 1, the conduit 75 is connected to the conduit 36 between check valves 86 and 88. The check valve 86 is arranged so as to permit withdrawal of liquid from the reservoir 38 but to prevent the delivery of liquid thereto. The check valve 88 is arranged so as to permit the delivery of liquid through conduit 36 into the chamber 16 but to prevent the withdrawal of liquid from the chamber through the conduit. These two check valves may be combined into a single component, if desired.

In operation of the pump 40, when the operator depresses the barrel actuator 72, liquid in the barrel 44 will be forced through the flexible conduit 75, conduit 36 and check valve 88 into the cell chamber 16. After the barrel actuator is released, the spring 66 returns the barrel to its uppermost position, thus drawing reagent from the reservoir 38 through the check valve 86 and conduit 75 into the barrel 44. A second depression of the barrel actuator 72 will repeat the cycle. From the foregoing it can be seen that there is provided by the invention a simple and inexpensive means for delivering repeatable volumes of liquid from the reservoir 38 into the chamber 16, and such volumes may be established at any predetermined value by adjustment of the stop member 52 or collar 81.

A second pumping device and switching arrangement is provided for draining liquid from the chamber 16 and for controlling the stirrer motor 34 and a normally open solenoid valve 90, which will be described later. This second pump and switching arrangement may be of the same basic structure as the pump 40 and switch 84 and like numbers primed are used to indicate like or corresponding parts. As the pump 40, the second pump 40' embodies a barrel actuator 72' which extends upwardly through a bore 78' in the housing wall 80. A finger 85' extends outwardly from the barrel actuator 72' for operating the switch 84' which controls the stirrer motor 34 and solenoid valve 90.

A conduit 92 connects the outlet passage 24 of the sample cell 12 to a waste reservoir 94. A line 96 vents the conduit 92 to atmosphere. The normally open solenoid valve 90 is provided in the line 96 and is arranged to close the line 96 upon actuation of the solenoid. A flexible conduit 75' connects the outlet 70' of barrel 44' of the second pump to the conduit 92. A check valve 98 is provided in the conduit 92 between the line 96 and conduit 75' while a second check valve 100 is provided in the conduit 92 between the flexible conduit 75' and the waste reservoir 94. The check valve 98 is arranged so as to permit flow through the conduit 92 from the chamber 16 into the conduit 75' and to prevent flow in the opposite direction through the conduit, while the check valve 100 permits flow of liquid into the waste reservoir but prevents withdrawal of waste from the reservoir.

In operation of the pump 40', upon depressing of the barrel actuator 72', any liquid in the barrel 44' is forced through the flexible conduit 75' and check valve 100 into the waste reservoir 94. Upon release of the barrel actuator 72', the coil spring (not shown) in the syringe pump 40' returns the barrel 44' to its uppermost position thereby drawing liquid from the chamber 16 through conduit 92, check valve 98 and conduit 75' into the barrel. A second depression of the actuator 72' will repeat the cycle so that the operator may selectively drain the chamber 16 and deliver the liquid withdrawn therefrom into the waste reservoir 94.

One important feature of the invention is the provision of restriction 102 in the conduit 92 adajacent to the outlet passage 24 of the sample cell. This restriction is preferably in the form of a restricted line or tubing formed of hydrophobic material such as polytetrafluoroethylene. The restriction serves two functions. First, it is sufficiently small and long so as to provide only slow drainage of the liquid from the chamber 16 during the exhaust stroke of the syringe pump 40'. We have found that if drainage of liquid from the chamber occurs rapidly, some droplets of liquid will remain on the chamber walls and stirring rod 30 and hence will not be carried away through the conduit 92 to the waste reservoir. However, slow drainage of liquid from the chamber 16, on the order of 5 to 10 ml. per minute in the case of a blood-glucose oxidase mixture, ensures complete drainage of the chamber by virtue of the surface tension of the body of slow moving liquid in the chamber carrying all droplets along with it through the bottom of the chamber. It is essential that no droplets remain in the chamber 16 in rate sensing analysis since such analysis requires precisely known concentrations of sample and reagent, and any variation in such concentrations as would result from droplets remaining in the chamber from a previous analysis will result in errors in the analysis.

Secondly, the restriction 102 is sufficiently small and long so as to function as a valve to prevent drainage of liquid from the chamber 16 out through the vent line 96 during analysis of the sample. The restriction 102, while being open, functions as a valve for the reason that when the syringe 40' is actuated to drain the chamber 16, gas enters the restricted line 102 together with liquid from the chamber 16. This gas is in the form of bubbles separating slugs of liquid in the restriction, and due to the surface tension of the bubbles on the walls of the restriction, liquid will not pass therethrough due only to the small head of liquid in the sample cell, but only when a suction is produced in the line 92 by the syringe 40'. Thus, the restriction 102 in the conduit must be dimensioned to prevent liquid flow therethrough except during the operation of the pump 40' and the dimension of the restriction will of course depend upon the viscosity of the liquid being analyzed. For a blood-glucose oxidase mixture, we have found that a restricted line 5 to 15 inches in length and having an inner diameter of .012 to .018 inch meets the above requirements for slow drainage and the valving function.

The solenoid valve 90 is normally open so that the conduit 92 is vented to atmosphere. This ensures that no residual vacuum will remain in the conduit 92 after operation of the syringe pump 40'. Otherwise, a residual vacuum in the conduit may draw liquid from the chamber 16 during the analysis thereof which would obviously produce errors in the analysis. The normally open vent line 96 further ensures that atmospheric pressure will be available to assist the barrel 44' to return to its uppermost position after actuation thereof by the operator. As will be seen later, the solenoid valve 90 is closed by the switch 84' upon operation of the syringe pump 40' so that when liquid is being drained from the chamber 16, air will not be drawn into the conduit 92 via the line 96.

Figure 2:
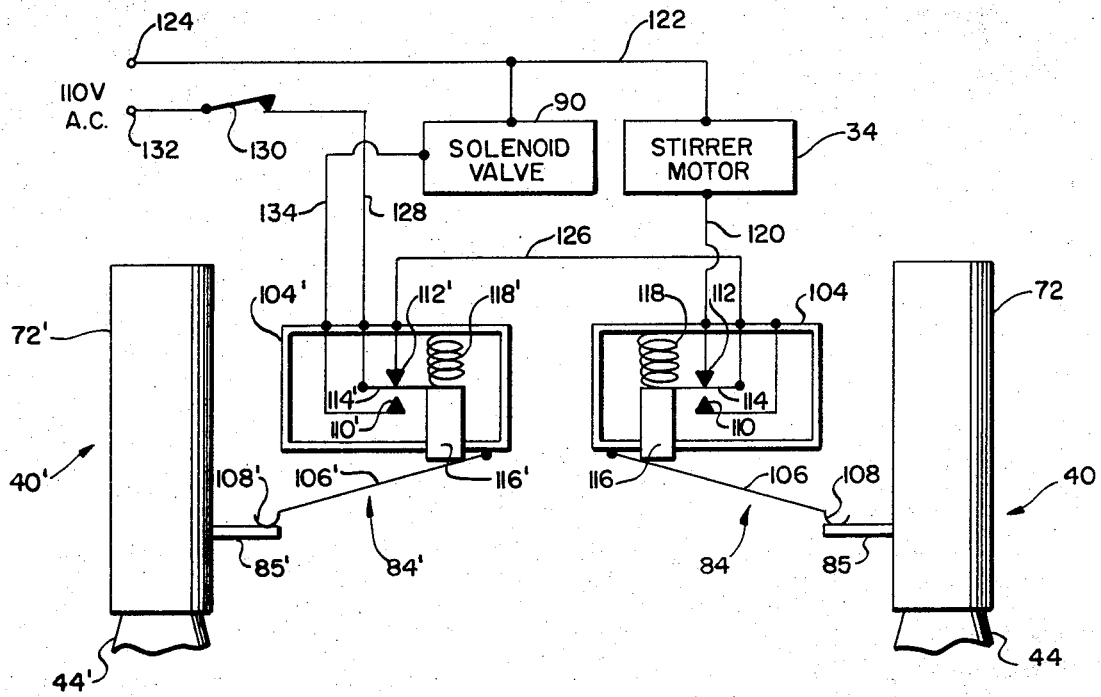
FIG. 2 is a schematic illustration of the control and switching arrangement utilized for actuating the stirrer motor and solenoid valve employed in the apparatus illustrated in FIG. 1.

Reference is now made to FIG. 2 which illustrates the control and switching arrangement for the solenoid valve 90 and stirrer motor 34. As indicated previously, the structure of switch 84' is essentially the same as switch 84 and like numbers primed are used to indicate like parts. The switch 84 includes a housing 104 to which there is pivotally mounted an arm 106 with its end 108 bearing against the upper surface of the finger 85. Two fixed switch contacts 110 and 112 are positoned in the housing 104. A pivotally mounted switch arm 114 is located between the contacts 110 and 112. An insulator button 116 extends through the housing 104 and is urged into engagement with the upper surface of the arm 106 by means of a spring 118. Fixed contact 112 is connected to one terminal of stirrer motor 34 by means of a conductor 120. The other terminal of the stirrer motor is connected by conductor 122 to one terminal of a power source, preferably 110 volt alternating current. The other fixed contact 110 of switch 84 is not utilized. The movable switch arm 114 is connected via a conductor 126 to the fixed contact 112' of switch 84'. The movable switch arm 114' of switch 84' is connected by a conductor 128 through switch 130 to the second terminal 132 of the power source. The other fixed contact 110' of switch 84' is connected via conductor 134 to one terminal of the solenoid valve 90 while the other terminal thereof is connected to conductor 122.

When it is desired to operate the apparatus 10, the switch 130 is closed. At this time the barrel 44 of syringe pump 40 is in its uppermost position. As a result, the switch actuator 85 urges the arm 106 upwardly, thus making contact between the movable switch arm 114 and the fixed contact 112. At the same time the barrel 44' is in its uppermost position so that contact is made between the fixed contact 112' and switch arm 114' of switch 84'. Under these conditions the stirrer motor 34 is energized. If the barrel actuator 72 is depressed, the spring 118 will shift the arm 114 out of contact from the fixed contact 112, thus de-energizing the stirrer motor 34 until the barrel 44 is returned to its uppermost position by the coil spring 66. Also, when the switch 84' is in the condition as illustrated in FIG. 2, the solenoid 90 is de-energized. If the barrel actuator 72' is depressed so that the spring 118' shifts the arm 114' out of contact with fixed contact 112' and into contact with fixed contact 110', the stirrer motor will be de-energized and the solenoid valve energized until the barrel 44' is returned to its uppermost position by the return spring in pump 40'.

The normal operation of the apparatus 10 is as follows. Let it first be assumed that the switch 130 is closed, that the barrel 44 contains a known quantity of reagent previously withdrawn from the reservoir 38 and that the barrel 44' contains a mixture of reagent and sample previously withdrawn from the chamber 16. With both the barrels 44 and 44' of the two pumps in their uppermost normal position as illustrated in FIGS. 1 and 2, the stirrer motor will be energized and the solenoid valve de-energized. At this time, the chamber 16 is empty. The barrel actuator 72 is then depressed to deliver reagent from the barrel 44 into the chamber 16 via the inlet passage 23. When the actuator 72 is moved downwardly, the switch arm 114 breaks contact with the fixed contact 112, thus de-energizing the stirrer motor during the delivery of reagent into the chamber 16. Thus the stirring element 30 is stationary when the reagent is introduced into the bottom of the chamber. This ensures that the liquid in the chamber will move up the chamber walls smoothly, displacing all air in the lower portion of the chamber, and hence avoiding bubbles from becoming formed and entrapped at the bottom of the chamber which might later creep upwardly to the sensing tip of the sensor 20. It is important to prevent bubbles near the sensing tip of the sensor inasmuch as the output of the sensor is adversely affected by bubbles passing across its sensing end. When the barrel 44 returns to its uppermost position upon release by the operator of barrel actuator 72, the finger 85 urges arm 114 into engagement with the contact 112, thus energizing the stirrer motor 34 so that the reagent will be stirred to equilibrate with the sensor and to provide mixing when sample is subsequently added to the cell for rate sensing analysis of the sample. After sufficient time (approximately 10 to 30 seconds) for equilibrating of the reagent with the sensor, a known quantity of sample, such as blood serum or urine, is introduced into the chamber 16 through the bore 19 in cap 18. At this time the stirring element 30 is rotating since the motor 34 is still energized. The stirring element 30 provides efficient mixing and transport of the reaction mixture to the sensor 20, which provides a measure of the progress of the reaction. The output of the sensor 20 is electronically processed to provide the desired rate-sensing analysis of the sample.

After the sample has been analyzed, the sample-reagent mixture is drained from the chamber 16 by depressing the barrel actuator 72'. During downward movement of the barrel 44', previous liquid contained in the barrel is delivered into the waste reservoir 94. When the return spring in the syringe pump 40' returns the barrel 44' to its uppermost position, liquid in the chamber 16 is drawn through the conduit 92 into the barrel 44'. During the time that the barrel actuator 72' is depressed and returned to its normal position, contact between arm 114' and fixed contact 112' is broken, thus de-energizing the stirrer motor 34. Hence, when liquid is being drained from the chamber 16, the stirring element 30 is stationary. This prevents a film of liquid from being retained on the walls of the chamber through the action of the stirring element during the draining process. Also, during this period of time, the solenoid valve 90 is energized by virtue of the contact between contact 110' and arm 114'. Thus, during the suction or vacuum stroke of the pump 40', that is, when the barrel 44' is returning to its uppermost position, the vent line 96 will be closed to ensure that flow of material into the barrel 44' will come only from the chamber 16 and not through the vent line. When the barrel 44' returns fully to its uppermost position, the stirrer motor 34 is again energized and the above procedure may be repeated for analyses of additional samples.

While the pump 40' has been described as being a syringe type pump having vacuum and pressure functions, it is to be understood that other forms of pumps may be utilized in place of the pump 40', such as an aspirator having only a suction function for withdrawing liquid from the chamber 16.

Figure 3:
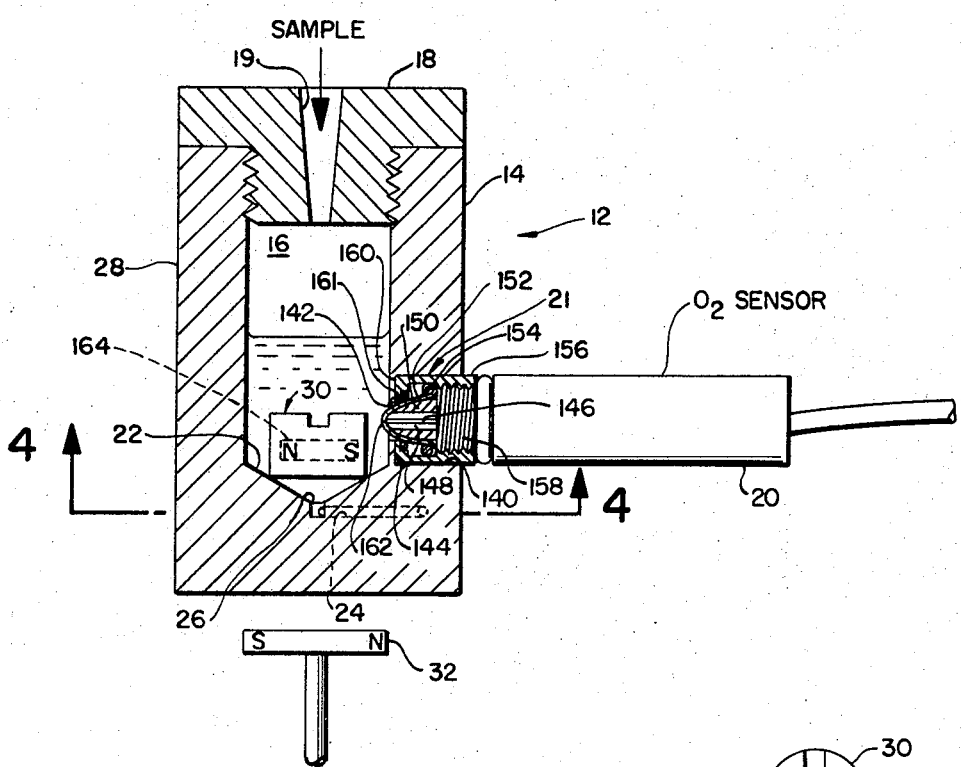
FIG. 3 is an enlarged partial longitudinal sectional view of the analysis cell employed in the apparatus illustrated in FIG. 1, with a polarographic oxygen sensor shown mounted therein.
Figure 4:
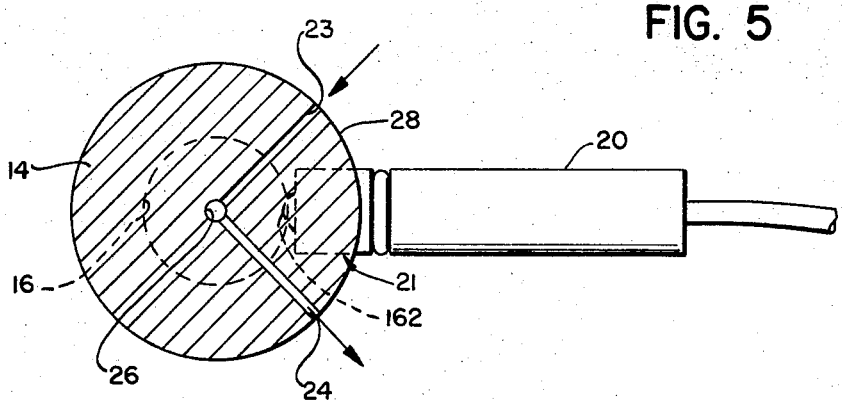
FIG. 4 is a horizontal sectional view taken along line 4—4 of FIG. 3.

Reference is now made to FIGS. 3 and 4 so that the structure of the cell 12, sensor 20 and stirring means may be described in greater detail. Preferably the reagent inlet passage 23 and outlet passage 24 of the cell extend at an obtuse angle with respect to one another, preferably at an angle of about 135°, as best seen in FIG. 4. With the passages so disposed, when reagent enters through passage 23, it will enter the chamber 16 rather than tend to flow directly out of the cell via the passage 24. Since the chamber 16 has a relatively small cross section as compared to its height, and due to the inclined walls of the conical bottom 22, rapid and essentially complete emptying of the chamber is achieved so that very little residue remains therein during the draining operation of the apparatus. As indicated previously, the stirring element 30 is stationary during the draining procedure so that liquid will not be thrown upon the walls of the chamber 16 and remain thereon during the draining of the chamber by syringe pump 40'.

In the specific embodiment of the invention described herein, the sensor is a polarographic oxygen sensor. However, it is to be understood that in addition to or instead of the polarographic oxygen sensor, other sensing means such as other electrochemical sensors or electrodes for electrolytic conductance measurement, could be mounted directly into the side of the sample cell in intimate contact with the fluid therein and the advantages of the cell 20 and stirring means therefor would be retained. In addition, the walls, or portions thereof, of the sample cell may be made optically transparent to permit sensing by optical means, such as light absorption, light scattering, or fluorescence, and the advantages of the over-all apparatus 10 would be retained.

The bore 21 in the side wall of cell 12 which receives the oxygen sensor 20 includes a relatively large diameter section 140 which opens at the outer surface 28 of block 14 and a relatively smaller diameter section 142 which opens into the chamber 16, defining therebetween an annular shoulder 144.

The sensor 20 includes a cathode or sensing electrode 146 sealed in a glass or plastic body 148 and an annular anode 150 surrounds the body. A selectively permeable membrane 152, formed of a material such as polyethylene, polytetrafluoroethylene or silicone rubber, is tightly held over the anode and cathode by means of a rubber O-ring 154. An electrolyte such as potassium chloride in a suitable gel is provided behind the membrane 152 for electrolytically joining the anode and cathode. Typically the anode is formed of silver while the cathode is formed of either gold or rhodium.

A cap 156 is threaded upon the forward end of the body 158 of the sensor. This cap is complementary to the the bore 140 with its forward end 160 abutting against the shoulder 144 in the block. The cap is formed with a central opening 160 at its forward end. The sensing end 162 of the sensor comprising the membrane covered cathode 146 extends through this opening 160 into the second section 142 of the bore 21. Preferably the opening 160 and bore section 142 are substantially the same diameter and the sensing end 162 of the sensor has a configuration complementary to that of the bore section 142 so that it will completely close the same and thus form a portion of the wall on chamber 16.

By the aforementioned mounting arrangement of the sensor 20, it is seen that only the sensing end 162 is exposed to liquid in the chamber 16 with the result that there is a minimum hang-up or retention of any liquid in the area of the sensor after liquid is withdrawn from the cell chamber 16.

Referring specifically to FIG. 4, it is seen that the bore 21 and sensor 20 are positioned between the passages 23 and 24 so that any liquid entering passage 23 will be directed into the chamber 16 in a direction away from the sensing end 162 of the sensor. This minimizes the possibility of any bubbles in the entering liquid from passing over the sensing end of the sensor which would introduce errors in the output signal of the sensor. It can be appreciated that because the sensor 20 is mounted in the side of the block 14, ready accessibility to the chamber 16 is possible from above the cell without the necessity of removing the sensor.

Figure 5:
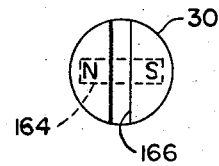
FIG. 5 is a top plan view of the stirring element employed in the cell illustrated in FIG. 3.

The stirring element 30 can best be seen in FIGS. 3 and 5. It has a generally cylindrical configuration and is preferably positioned in chamber 16 so that its longitudinal axis, or axis of rotation, is coaxial with the vertically extending longitudinal axis of the chamber. Preferably the element is formed of a hydrophobic plastic such as polytetrafluoroethylene or polypropylene. A horizontally extending permanent magnet 164 having poles at its opposite ends as indicated in FIGS. 3 and 5 is embedded in the element 30. Thus, the magnetic axis of element 30 is generally perpendicular to the axis of rotation of the element. Hence, when the magnet 32 is rotated by the motor 34, the element 30 will rotate about the longitudinal axis of the chamber 16.

As best seen in FIG. 5, a groove 166 extends diametrically across the upper end of element 30. By virtue of this groove, and the relative position of element 30 to sensor 20, upon rotation of the element 30 a relatively high tangential stirring force will be produced upon the liquid adjacent to the sensing end 162 of the oxygen sensor without appreciable cavitation being produced in the liquid. This arrangement provides a high signal-to-noise ratio which is important in a direct differentiation system such as disclosed in the aforementioned Sternberg application.

Preferably element 30 has a substantial volume as compared to the volume of the chamber 16 below the upper portion of the sensing end 162 of the sensor 20. For example, it is desired that the diameter of the element 30 be nearly as great as the diameter of the chamber 16. By virtue of the volume of the element and its orientation in the chamber 16, only a relatively small amount of reagent is required to be delivered to the chamber in order to reach a level above the sensing end 162 of the oxygen sensor. The small amount of reagent permits the use of small samples in the cell 12 of the present invention, so that rapid rate sensing analysis may be achieved on samples as small as 10 to 20 microliters of blood serum or plasma.

Although we have herein shown and described our invention in what we have conceived to be the most practical and preferred embodiment, it is recognized that departures may be made therefrom within the scope of our invention, which is not to be limited to the details disclosed herein but is to be accorded the full scope of the claims so as to embrace any and all equivalent structures and devices.

What is claimed is:

1. An apparatus for analyzing liquid sample comprising:
    an analysis cell having a chamber therein adapted to hold a liquid sample;
    inlet and outlet passages in said cell communicating with said chamber;
    first and second pumping means, said first pumping means producing pressure and vacuum strokes and said second pumping means being capable of producing at least a vacuum function;
    a reagent reservoir;
    first conduit means connecting said reagent reservoir to said inlet passage and said first pumping means;
    said first pumping means being selectively operable to withdraw a predetermined amount of reagent from said reservoir during its vacuum stroke and to deliver said reagent to said chamber through said first conduit means during its pressure stroke;
    second conduit means connecting said outlet passage to said second pumping means;
    said second pumping means being selectively operable to withdraw liquid from said chamber through said outlet passage and said second conduit means; and
    a restriction in said second conduit means adjacent to said outlet passage, said restriction being sufficiently small to prevent liquid flow therethrough except during operation of said second pumping means.

2. An apparatus as set forth in claim 1 including:
    a liquid stirrer in said chamber;
    a motor for rotating said stirrer; and
    means operable during the pressure stroke of said first pumping means to de-energize said motor.

3. An apparatus as set forth in claim 2 including means operable during the operation of said second pumping means to de-energize said motor.

4. An apparatus as set forth in claim 3 including:
    a vent to atmosphere in said second conduit means;
    normally open valve means in said vent; and
    means closing said valve means and, therefore, said vent during operation of said second pumping means.

5. An apparatus as set forth in claim 1 including:
    a liquid stirrer in said chamber;
    a motor for rotating said stirrer; and
    means operable during the operation of said second pumping means to de-energize said motor.

6. An apparatus as set forth in claim 1 including:
    means normally venting said second conduit means to atmosphere; and said venting means being closed during operation of said second pumping means.

7. An apparatus as set forth in claim 1 wherein:
    said first pumping means comprises a syringe including a stationary plunger slidably received in one end of a movable barrel having an outlet at its opposite end, means limiting the extent of slidable movement of said barrel relative to said plunger, and spring means biasing said barrel to its outermost position relative to said plunger;
    said first conduit means including a flexible portion connected to said outlet so that said conduit is free to move together with said barrel; and
    said pumping means performing its pressure stroke upon pushing of said barrel toward said plunger and performing said vacuum stroke when said barrel is returned to its outermost position by the force of said spring means.

8. An apparatus as set forth in claim 7 wherein:
    said second pumping means comprises a second syringe including a second stationary plunger slidably received in one end of a second movable barrel having an outlet at its opposite end, second spring means biasing said second barrel to its outermost position relative to said second plunger;
    said second conduit means includes an outlet to waste and a flexible portion connected to said outlet of said second barrel; and
    said second pumping means delivering liquid to waste through the outlet of said second conduit means upon pushing of said second barrel toward said second plunger and withdrawing liquid from said chamber when said second barrel is returned to its outermost position by the force of said second spring means.

9. An apparatus as set forth in claim 8 including:
    a liquid stirrer in said chamber;
    a motor for rotating said stirrer;
    switching means for controlling said motor, said switching means when opened de-energizing said motor;
    a first switch actuator carried by said first barrel for opening said switching means during the pressure stroke of said first pumping means; and
    a second switch actuator carried by said second barrel for opening said switching means during the period said second pumping means withdraws liquid from said chamber.

10. An apparatus as set forth in claim 9 including:
    a vent to atmosphere in said second conduit means;
    normally open valve means in said vent; and
    means carried by said second barrel for closing said valve means when said second pumping means withdraws liquid from said valve chamber.

11. An apparatus for analyzing liquid samples comprising:
- an analysis cell having a chamber therein adapted to hold a liquid sample;
- inlet and outlet passages in said cell communicating with said chamber;
- first and second pumping means, said first pumping means producing pressure and vacuum strokes and said second pumping means being capable of producing at least a vacuum function;
- a reagent reservoir;
- first conduit means connecting said reagent reservoir to said inlet passage and said first pumping means;
- said first pumping means being selectively operable to withdraw a predetermined amount of reagent from said reservoir during its vacuum stroke and to deliver said reagent to said chamber through said first conduit means during its pressure stroke;
- second conduit means connecting said outlet passage to said second pumping means;
- said second pumping means being selectively operable to withdraw liquid from said chamber through said outlet passage and said second conduit means;
- said first pumping means comprising a syringe including a stationary plunger slidably received in one end of a movable barrel having an outlet at its opposite end, means limiting the extent of slidable movement of said barrel relative to said plunger, and spring means biasing said barrel to its outermost position relative to said plunger;
- said first conduit means including a flexible portion connected to said outlet so that said conduit is free to move together with said barrel;
- said pumping means performing its pressure stroke upon pushing of said barrel toward said plunger and performing said vacuum stroke when said barrel is returned to its outermost position by the force of said spring means; and
- means in said second conduit means adjacent to said outlet passage for preventing liquid flow through said second conduit means except during operation of said second pumping means.

12. An apparatus as set forth in claim 11 including stirring means in said chamber and means for inactivating said stirring means during the pressure stroke of said first pumping means.

13. An apparatus as set forth in claim 11 including stirring means in said chamber and means for inactivating said stirring means during operation of said second pumping means.

References Cited
UNITED STATES PATENTS

| | | | |
|---|---|---|---|
| 3,223,486 | 12/1965 | Hall et al. | 23—253 |
| 3,014,848 | 12/1961 | Ferrari | 195—103.5 |
| 3,374,065 | 3/1968 | Suzuki | 23—253 |

A. LOUIS MONACELL, Primary Examiner

W. A. SIMONS, Assistant Examiner

U.S. Cl. X.R.

23—253, 259; 195—103.5 C; 204—195